United States Patent [19]

Busch et al.

[11] 4,078,425
[45] Mar. 14, 1978

[54] WIND DIRECTION INDICATOR FOR SAILBOATS

[75] Inventors: Dieter Busch, Wollstadt; Wolfgang Schüller, Zeilsheim; Manfred Stein, Eschborn, all of Germany

[73] Assignee: VDO Adolf Schindling AG, Frankfurt am Main, Germany

[21] Appl. No.: 675,739

[22] Filed: Apr. 12, 1976

[30] Foreign Application Priority Data

May 2, 1975  Germany .............................. 2519477

[51] Int. Cl.² .......................................... G01W 1/00
[52] U.S. Cl. ................................................... 73/188
[58] Field of Search ................. 73/188, 189; 340/177, 340/196; 324/45

[56] References Cited

U.S. PATENT DOCUMENTS

| 1,281,658 | 10/1918 | Remy et al. | 340/177 R |
| 2,536,805 | 1/1951 | Hansen, Jr. | 340/177 R |
| 3,572,116 | 3/1971 | Penn | 73/189 |
| 3,791,211 | 2/1974 | Dobesch | 73/188 |

FOREIGN PATENT DOCUMENTS

| 179,889 | 12/1906 | Germany | 340/177 R |
| 171,135 | 11/1921 | United Kingdom | 340/177 R |

*Primary Examiner*—Jerry W. Myracle
*Assistant Examiner*—John P. Beauchamp
*Attorney, Agent, or Firm*—Otto John Munz

[57] ABSTRACT

The invention relates to a wind direction indicator for sailboats wherein a rotatably mounted permanent magnet connected to the shaft of a weather vane is employed as a pick-up. By means of its magnetic field, it controls, in dependency upon the wind direction with great respect to the midship line two magnetically controllable semiconductors mutually displaced by an angle of 90°. This is an improvement over U.S. Pat. No. 3,791,211.

4 Claims, 1 Drawing Figure

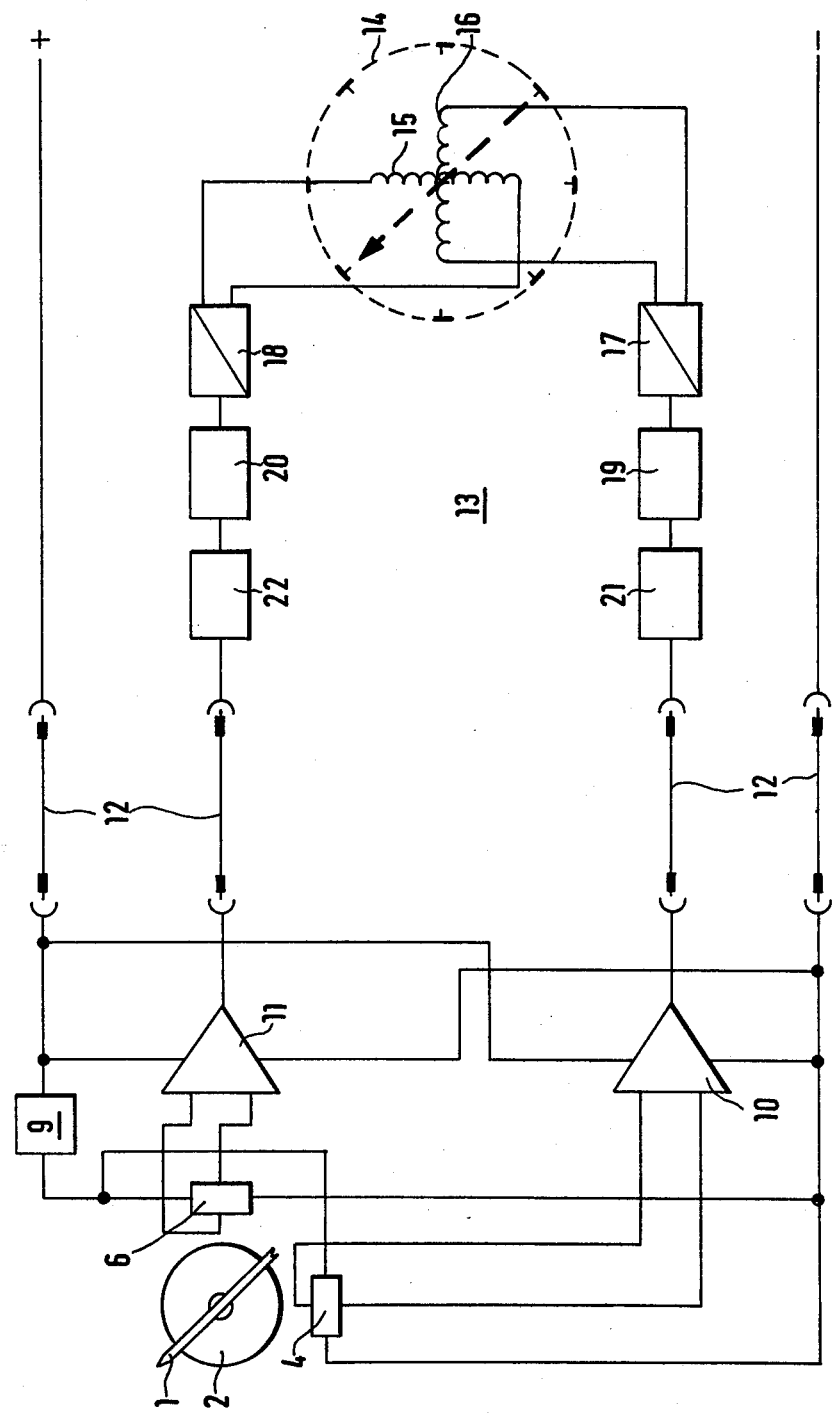

WIND DIRECTION INDICATOR FOR SAILBOATS

FIELD OF THE INVENTION

A wind-direction indicator with a rotary permanent magnet is coupled to the shaft of a weather vane to control semiconductors spaced from each other within the effective range of the magnetic fleid.

DESCRIPTION OF THE PRIOR ART

As explained in U.S. Pat. No. 3,791,211, a wind direction indication over the entire range of 360° of the rose of the compass can be achieved by means of such a device if each of the two semiconductors is connected to a separate indicating instrument. In this prior art device, one of the indicating instruments indicates the wind direction in a range of 180° symmetrically to the midship line, while the other indicating instrument indicates whether the wind comes from the front or from the after deck. A disadvantage of such an indicator is that two indicating instruments are needed and consequently the total apparatus is relatively expensive and of a relatively large structural volume.

It is, furthermore, already known to provide a semicircular disc on the shaft that supports the permanent magnet. The semicircular disc switches a photoelectric system consisting of a light source and a photo-sensitive element, to which system an incandescent lamp is connected. The flashing or absence of flashing of the lamp then indicates whether the wind comes from the front or after deck, while the hand of the indicating instrument indicates the wind-direction angle. Such a solution eliminates the disadvantages of the apparatus described above, but it has the disadvantage that, especially under unfavorable light conditions, the flashing or non-flashing of the incandescent lamps is overlooked and consequently a wrong wind-direction angle is read on the indicating instrument.

SUMMARY OF THE INVENTION

The objects of the invention are to provide a wind direction indicator, which:

is an improvement over that described in U.S. Pat. No. 3,791,211 by eliminating a second indicating instrument;

employs only one circuitry to indicate wind directions over the entire 360° range of the rose of a compass positively without reliance on auxiliary signals such as optical light flashing, or absence thereof;

has a small structural volume;

is simple and inexpensive in manufacture and assembly;

is unaffected by variations in the supply voltage, and reduces interference occurring in the prior art instruments due to influence of foreign magnetic fields on the transmission line, and permits a correct and dependable reading of the wind directions even under unfavorable conditions.

Other objects and advantages of the invention will become apparent to those skilled in the art on hand of the following description, claims and drawings.

BRIEF DESCRIPTION OF THE DRAWINGS

The sole FIGURE of the drawings shows the circuit diagram of an embodiment of the present invention.

DESCRIPTION OF THE PREFERRED EMBODIMENTS

The wind direction indicator comprises a weather vane shaft 1 on which is mounted a magnet 2. In the effective range of this magnet are provided Hall elements 4 and 6 mutually displaced at a 90° angle. Both Hall elements are connected, by way of a voltage stabilizer 9, to the operating voltage while their Hall voltage outputs are connected respectively to amplifiers 10 and 11. The two amplifiers, together with the Hall elements and the permanent magnet, are arranged in a housing which is generally mounted on a spot remote from the indicator, such as on the masthead of the sailboat.

The outputs of the two amplifiers are connected, by way of an amplifier-connecting line 12 to the indicator system 13.

The indicator 13 comprises a cross-coil instrument 14 with windings 15 and 16 mutually displaced at a 90° angle. The two windings are respectively connected to the outputs of voltage-current converters 17 and 18, associated with these windings. These voltage-current converters are respectively connected, by way of a series-connected impedance transformers 19 and 20 and damping elements 21 and 22, to the outputs of the two amplifiers 10 and 11. By providing respective amplifiers between the transmission line 12 and each of the Hall elements, and by interposing respective damping elements 21 and 22, respectively, between the cross coil instrument 14 and the transmission line 12, interferences induced in the transmission line 12 do not produce a falsification of the data indicated.

The angle of displacement preferably is 90° for a sailboat.

The wind direction indicator of the invention may also be utilized with minor adjustments on installations other than sailboats, such as airports, airplanes, dirigibles and weather stations.

What is claimed is:

1. A wind-direction indicator to indicate the wind directions symmetrically to a predetermined line, comprising:

a wind vave on a rotatable shaft;

a permanent magnet mounted for rotation with said shaft in dependence upon the wind direction;

two semi-conductors magnetically controllable by the magnetic field of the permanent magnet, mounted within the effective range of said magnet and displaced from each other at an angle;

a crossed-coil indicator with two coil windings angularly disposed toward each other;

each of said semi-conductors being connected to one of said windings.

2. A wind direction indicator as claimed in claim 1, further comprising:

a transmission line and two amplifiers, one amplifier being respectively interposed between each semiconductor and the transmission line, and two damping elements, one damping element being respectively interposed between the transmission line and each coil winding.

3. A wind direction indicator as claimed in claim 1, the angle of displacement of said semi-conductors being 90°.

4. A wind-direction indicator for indicating wind directions with respect to a predetermined line, comprising:

(A) a wind vane mounted on a rotatable shaft, (B) a permanent magnet mounted on the shaft for rotation with the wind vane, (C) two magnetically controlled semiconductor elements mounted adjacent to the magnet mutually displaced by 90° about the shaft, and each energized by a two-polarity supply voltage, (D) a crossed-coil indicator comprising two coil windings and an indicator needle, the two coils being arranged perpendicular to each other, (E) two differential amplifiers respectively connected to the two semiconductor elements for amplifying output signals from each of the semiconductor elements and applying the resulting amplified signals respectively across the two coils, whereby the indicator needle follows the wind vane through 360°.

* * * * *